United States Patent

[11] 3,628,318

| | | |
|---|---|---|
| [72] | Inventor | Ben T. Grobowski<br>Newark, Ohio |
| [21] | Appl. No. | 10,449 |
| [22] | Filed | Feb. 11, 1970 |
| [45] | Patented | Dec. 21, 1971 |
| [73] | Assignee | A-T-O Inc.<br>Cleveland, Ohio |

[54] REEL-TYPE LAWN MOWER WITH HEIGHT OF CUT ADJUSTMENT
8 Claims, 7 Drawing Figs.

[52] U.S. Cl. .................................................... 56/249
[51] Int. Cl. .............................................. A01d 55/20
[50] Field of Search .......................................... 56/249,
251, 253, 254

[56] References Cited
UNITED STATES PATENTS

| 3,217,479 | 11/1965 | Robinson et al. | 56/254 |
| 3,423,919 | 1/1969 | De Poy Cook | 56/249 |
| 2,091,077 | 8/1937 | Limback | 56/253 |
| 2,583,543 | 1/1952 | Boyce et al. | 56/249 |

*Primary Examiner*—Louis G. Mancene
*Assistant Examiner*—J. N. Eskovitz
*Attorney*—Mahoney, Miller & Stebens ABSTRACT: A reel-type lawn mower with height of cut adjustment by means of which the reel and associated cutter blade or bedknife are maintained in cooperative relationship, with the cutter blade in a predetermined angular relationship relative to the ground, or other surface on which the supporting wheels are disposed, throughout the extent of the adjustment. The adjustment is such that it simultaneously adjusts both side plates along with the reel and cutter blade or bedknife supported thereby, by bodily moving the sideplates vertically while maintaining both the wheels and rear supporting roller in contact with the ground. The adjustment is accomplished by moving the wheels vertically relative to the side plates and, through a parallelogram linkage connection, simultaneously moving the supporting roller vertically in the same direction and to the same extent relative to the sideplates.

INVENTOR.
BEN T. GROBOWSKI
BY-MAHONEY & MILLER

ATTORNEYS

3,628,318

REEL-TYPE LAWN MOWER WITH HEIGHT OF CUT ADJUSTMENT

Many types of height of cut adjustments have been provided in the prior art. Some are very difficult to use because they adjust each side of the mower independently. Others adjust both sides together but change the angle of the bedknife relative to the ground, which is undesirable. Still others provide complicated mechanism for maintaining this angle during the adjustment by adjusting the wheels and roller relative to the sideplates which carry the bedknife including complicated and expensive cam mechanism for connecting the wheels and roller for simultaneous adjustment. My present invention accomplishes the adjustment of the wheels and roller simultaneously relative to the sideplates by simple low-cost mechanism so that, assuming the wheels and roller are in contact with the ground, the sideplates and the cooperating bedknife carried thereby, are adjusted bodily vertically relative to the ground, and this simultaneous adjustment of the wheels and roller is provided by a simple, low-cost connection between the wheels and the roller which, in effect, is parallelogram linkage.

In the accompanying drawings, I have illustrated a preferred embodiment of my invention and in these drawings.

Figure 1:
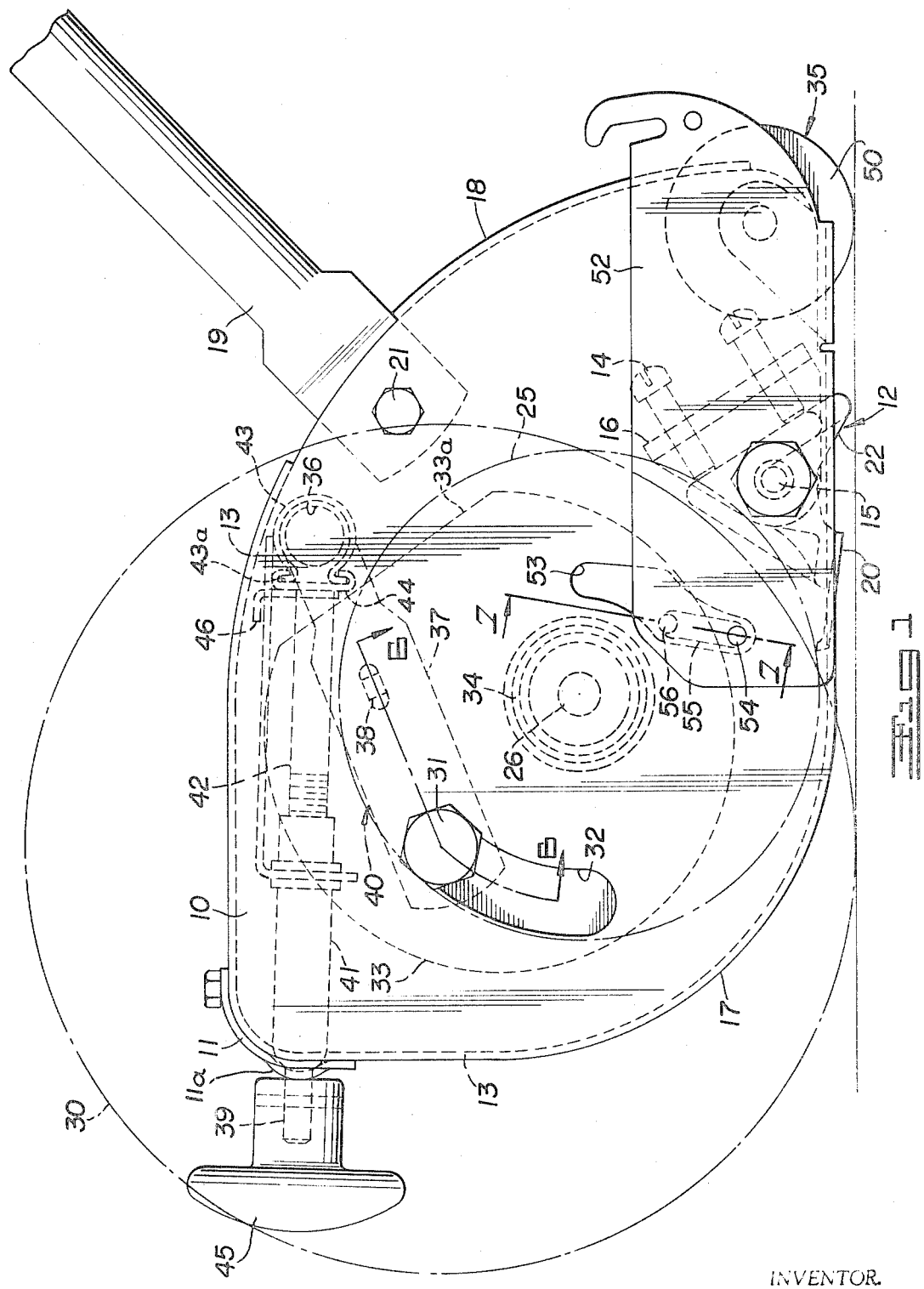
FIG. 1 is a side elevational view of a lawn mower of the reel type with a height of cut adjustment according to my invention, the reel being in its lowermost position.

With particular reference to the drawings, which show some conventional parts schematic, my invention is shown applied to a lawn mower which has a rigid frame consisting of a pair of upright vertical sideplates 10 rigidly joined together by a forward crossbar 11 and by a rearward cutter bar assembly 12. It will be noted that the plates 10 are substantially planar but have inturned flanges 13 for reinforcement and that they are identical except that they are allochiral.

It will be noted that the forward and lower portions of the plates 10 are rounded, as indicated at 17, and that the lower and rearward portions are rounded, as indicated at 18. With these portions 18, the lower end portions 19 of a suitable handle are associated and are pivoted to the sideplates, as indicated at 21. It will also be noted that the crossbar 11 is at the forward and upper corner of the plates and that the cutter bar assembly 12 is at the lower edges of the plates intermediate their longitudinal extent. The assembly 12 includes a bar 22 which is pivoted to the sideplates 10 for rotation about the axes of pins 15 which are carried by brackets 16 that are rigidly secured to the respective sideplates. The bar 22 carries the bedknife 20 and the angle of this knife relative to the ground can be set by means of pairs of bolts 14 which extend through portions of the brackets 16 and engage the bar 22 for adjusting it around the axis of the pins 15.

The reel 25 is of the usual type and is merely shown schematically. It is adapted to cooperate in the usual manner with the bedknife 20. The reel is carried by the shaft 26 which has its opposite ends mounted in bearings 27 carried by the respective sideplates 10. The reel 25 is driven in the customary manner by the ground-engaging wheels 30 which are supported in a manner to be described.

These parts will serve to provide the height of cut adjustment of my invention by providing for bodily adjustment of the sideplates 10, relative to the wheels 30 and the rear supporting roller assembly 35, assuming the wheels and roller assembly are in contact with the ground or other supporting surface. Since the reel 25 and cooperating bedknife 20 are carried in relatively fixed positions on the plates 10, they will remain in proper cooperation and the angle of the knife will not be changed during this adjustment. The angle of the knife relative to the ground is maintained by having a linkage connection between the wheel supporting means and the roller supporting parts which produces simultaneous and equal vertical adjustment of the wheels and rollers and in the same direction. The wheels 30 are of usual construction and are mounted at opposite sides of the mower outside the respective sideplates 10 for vertical movement relative thereto. Each wheel is carried by an axle 31 which passes through an arcuate slot 32 in the sideplate, the slot being concentric with the reel shaft 26 and being located forwardly and upwardly relative thereto. The inner end of the axle 31 is carried in an eccentric support and pivot disc 33 which is flattened at its edge at 33a for handle clearance. This disc is mounted eccentrically by means of a bearing 34 on the reel shaft 26 for pivoting thereabout. To connect the two discs 33 together for simultaneous rotative adjustment about the axis of the reel shaft 26, a rigid yoke member 40 is provided. This yoke member includes a main transversely extending connecting rod 36 and the flat arms 37 extending inwardly therefrom at each end and at right angles thereto. The outer surface of each arm is in flat contact with the inner surface of the associated disc 33. Each arm is fixed to the associated disc 33 by a keying member 38, it being noted from FIGS. 1 to 3 that the arms 37 are disposed substantially chordal to the disc.

The cross rod 36 of the yoke 40 is disposed rearwardly and upwardly of the reel axis 26 adjacent the upper edges of the plates 10. The arms 37 extend forwardly and downwardly therefrom at an angle and it will be apparent that forward or rearward movement of the rod 36 will change this angle and will move the wheel supporting axles 31 downwardly or upwardly in the slots 32 in the sideplates 10 and thereby move both wheels 30 simultaneously to the same extent relative to the sideplates. For producing this movement, a height of cut adjusting knob 45 is carried by the crossbar 11 at the forward side of the mower. This knob 45 is keyed on a stem 39 of a threaded socket member 41. The stem 39 is free to rotate in the bar 11 as well as to swing vertically relative thereto permitting corresponding rotative and vertical swinging movement of the member 41 relative to the bar. A ball and socket-type bearing joint is provided at 11a to facilitate this swinging as well as rotation of the knob without binding. This member 41 receives the outer end of screw 42 which has inner end fixed to the rod 36 of the yoke 40. The anchoring is accomplished by a split collar 43 around the rod 36 which has flanged wings 43a at its forward side which are slipped within a channel portion 44 to which the rear end of the screw 42 is fixed. Fixed to the portion 44, is a pointer 46 which cooperates with a scale 47 that is anchored to the socket member 41 at 47a to permit relative rotation of the member 41.

Rotation of the knob 45 will rotate the socket member 41 and cause the screw 42 to thread in or out of the socket member and, consequently, move the rod 36 correspondingly forwardly or rearwardly. The member 41 is fixed axially and carries the scale 47 so that the pointer 46 will move along the scale 47 indicating the height of adjustment. Any required vertical swinging movement of the member 41 relative to the bar 11, as a result of vertical swinging movement of the rod 36, will be permitted. Thus, there is provided a screw and scale assembly which can be readily actuated to raise or lower the wheels 30 relative to the sideplates 10 and which will indicate the height of cut.

Figure 2:
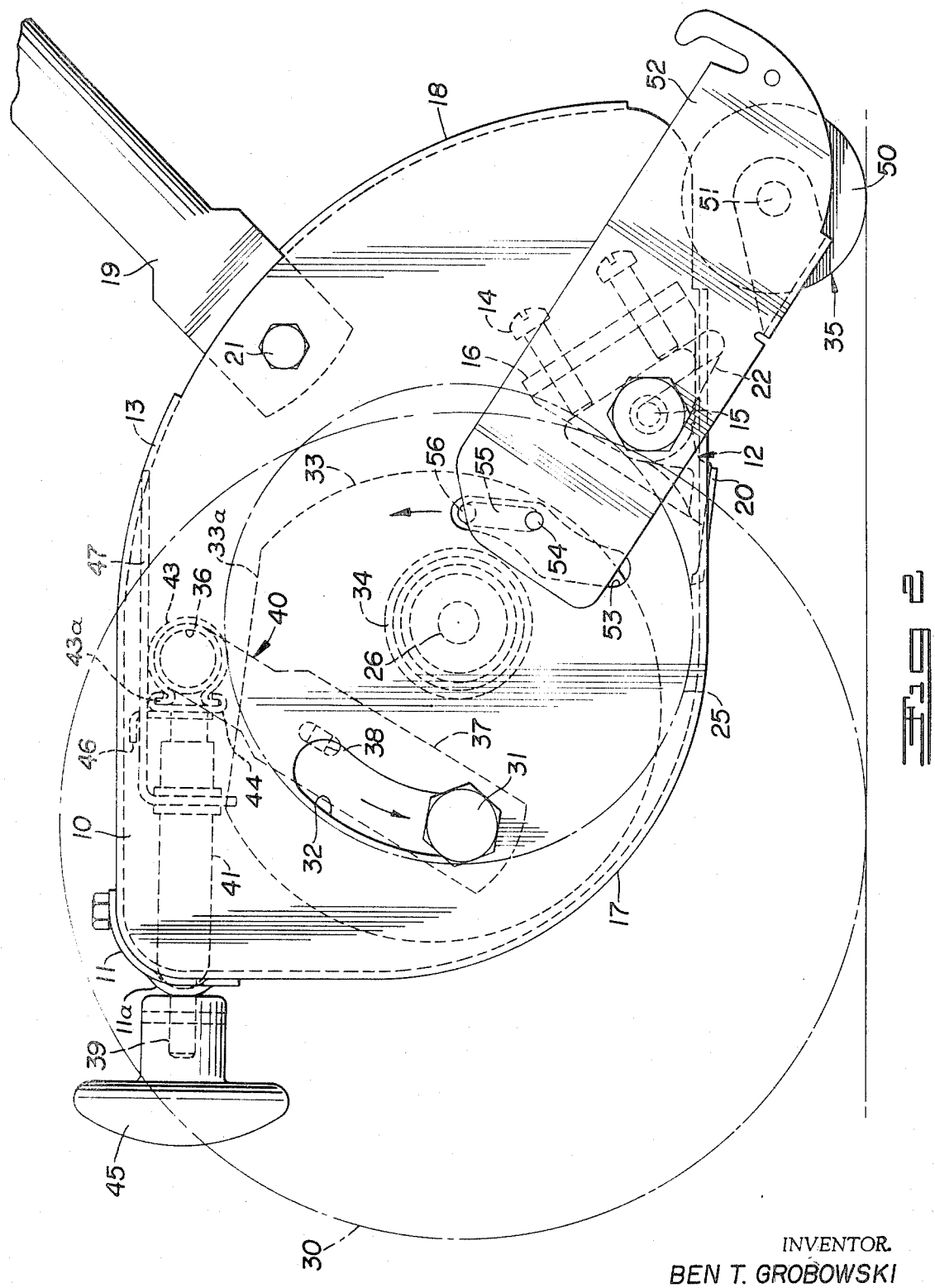
FIG. 2 is a similar view but with the reel in its uppermost position.
Figure 3:
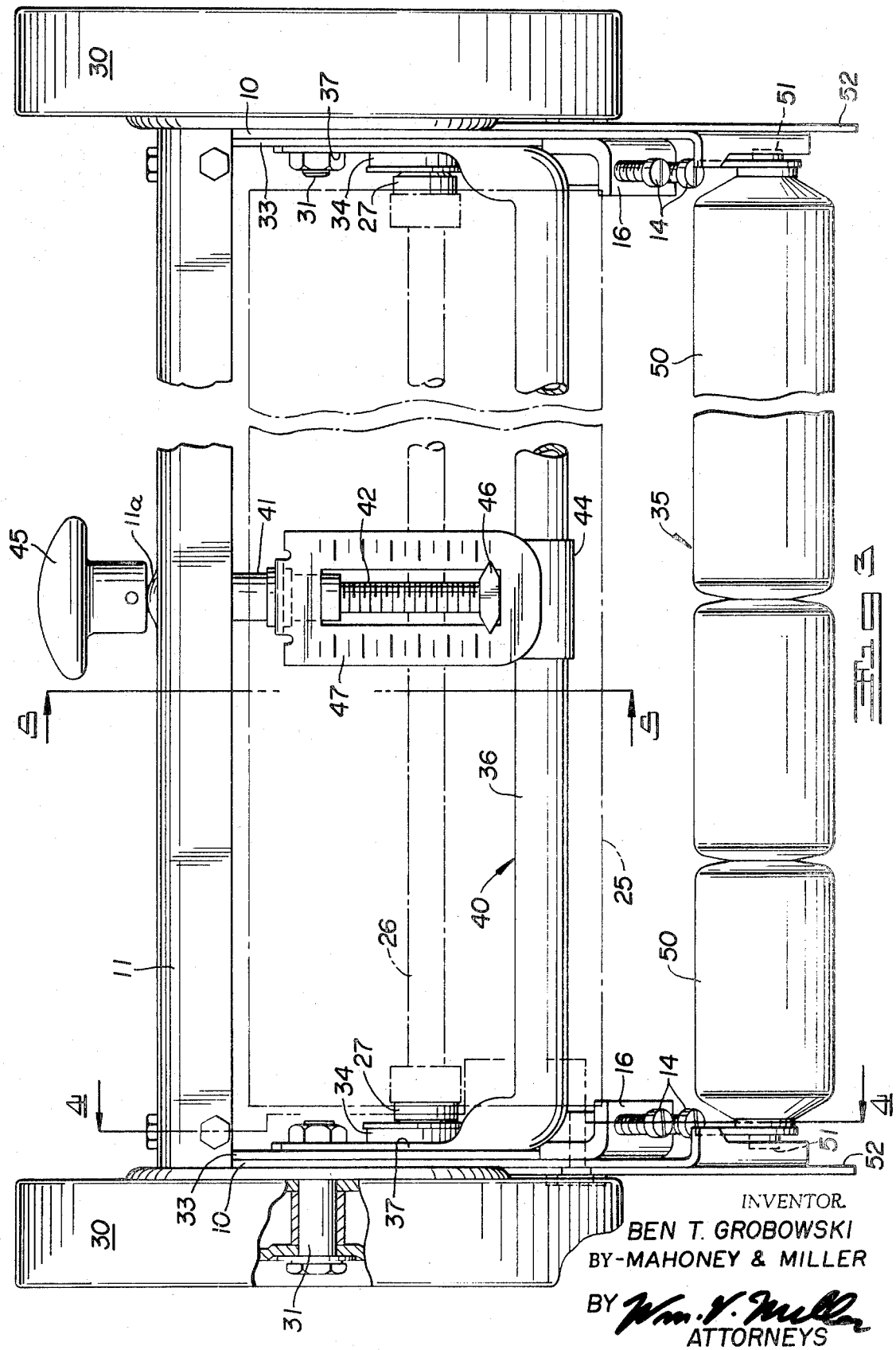
FIG. 3 is a plan view of the mower.
Figure 4:
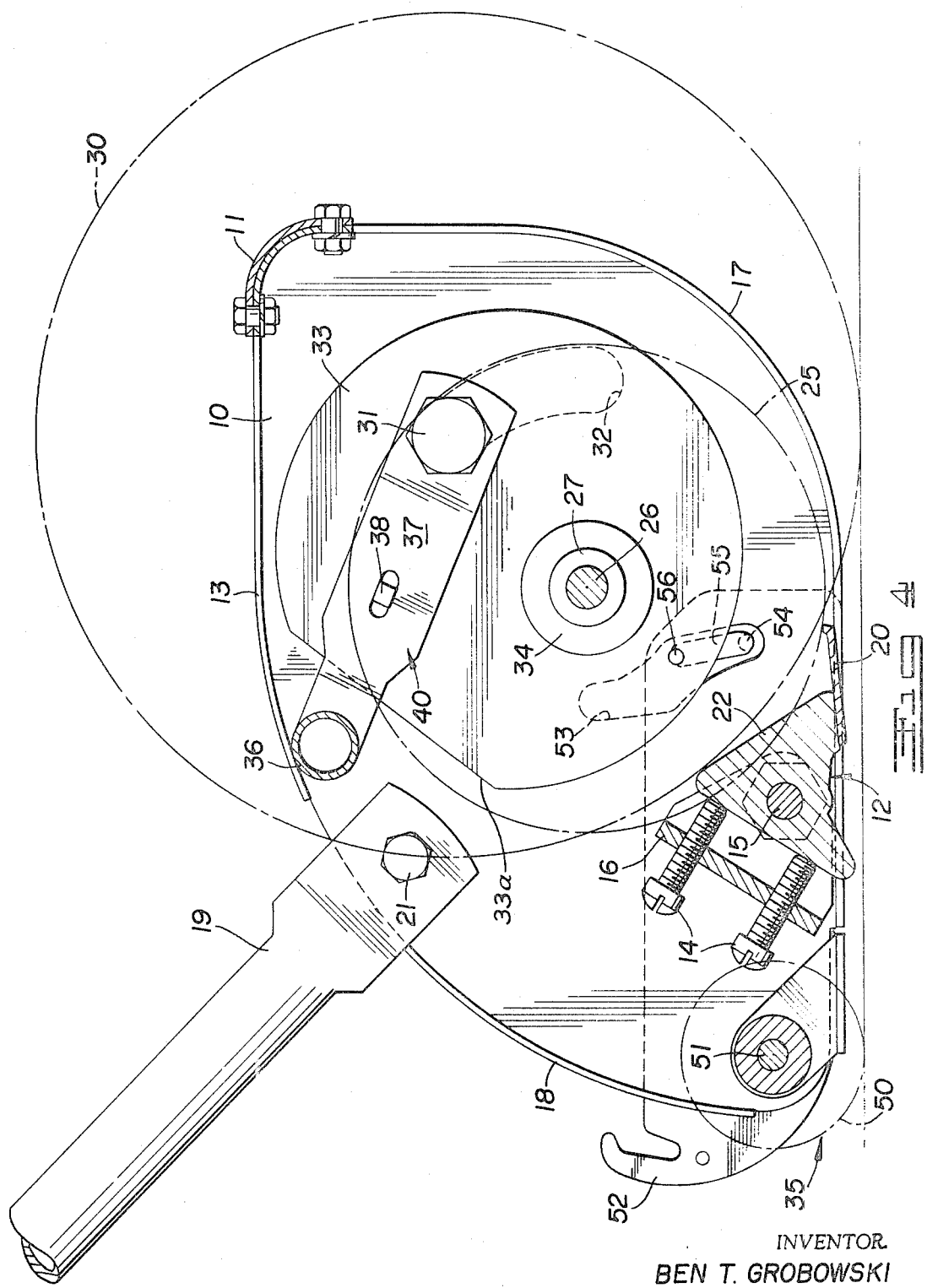
FIG. 4 is a sectional view taken along line 4—4 of FIG. 3.
Figure 5:
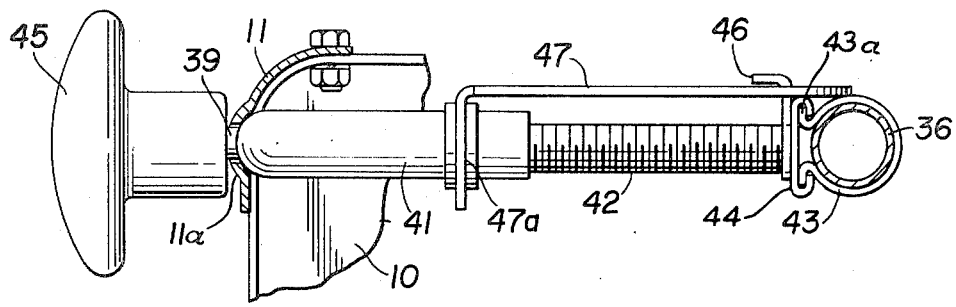
FIG. 5 is an enlarged sectional view taken along line 5—5 of FIG. 3.
Figure 6:
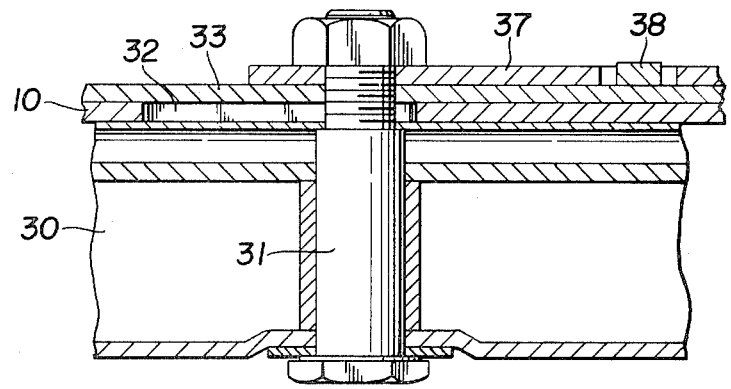
FIG. 6 is an enlarged sectional view taken along line 6—6 of FIG. 1.
Figure 7:
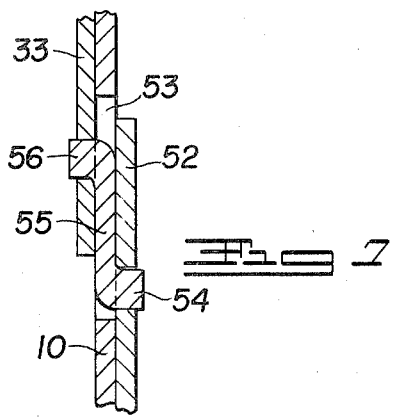
FIG. 7 is a sectional view taken along line 7—7 of FIG. 1.

In order to maintain the bedknife 20 at the original or preset angle relative to the ground during the height of cut adjustment, means is provided for mounting the roller assembly 35 for vertical adjustment relative to the sideplates and for producing corresponding vertical adjustment of the roller assembly whenever the wheels 30 are adjusted vertically relative to the sideplates. The roller assembly 35 consists of one or several rollers 50 which are mounted on a transverse shaft 51. This shaft 51 is rotatably mounted at its opposed ends in a pair of roller support arms or brackets 52. These arms 52 are disposed in spaced-parallel relationship and are located just outside the respective sideplates 10. The two arms are mounted for vertical swinging movement about the pins 15 which are provided for the knife bar 22. Thus, the arms 52 are mounted for vertical movement and are connected together at the rear ends by the roller shaft 51 so that they will move simultaneously. The arms 52 extend forwardly beyond the pivot axis provided by the pins 15 and the forward ends of these arms are connected to the respective pivot discs 33, it being noted that the arms are disposed outside the respective sideplates 10 and the connections extends through slots 53 provided in the plates 10. The connections are linkage connections and each connection comprises a link 55 of substantially Z form which has an outwardly projecting pivot portion 54 and an inwardly projecting pivot portion 56. The portion 54 is rotatably disposed in an opening in the roller supporting arm 52 and the portion 56 is rotatably disposed in an opening in the pivot disc 33. With the arms 52 substantially horizontal as indicated in FIG. 1, which is the lowest position of the reel 25 and cooperating knife 20, the kink 55 is substantially vertically disposed in the slot 53 and is in the lower end thereof. Upward swinging of the forward ends of the arms 52 about the axis of the pivots 15 will move the links 55 vertically upwardly in the slots 53 and it will be noted that the upper ends of these slots are offset rearwardly to compensate for the arcuate movement of the forward ends of the arms 52. The uppermost position of the links 55 is indicated in FIG. 2 which shows the reel 25 and associated bedknife 20 in their highest positions.

Thus, any rotation of the pivot discs 33 about the axis 26 of the reel 25 to adjust the wheels 30 will result in a vertical swinging movement of the rear ends of the arms 52 which will produce a vertical movement of the rollers 50 to the same extent and in the same direction as that of the wheels. The pivot discs 33 and connected yoke arms 37, the links 55 and the roller arms 52, in effect, provide parallel linkage for adjusting the wheels 30 and the roller assembly 35 vertically to the same extent simultaneously and in the same direction. Consequently, the knife 20 is maintained at the same angle relative to the common plane of contact of the wheels 30 and rollers 50 with the ground or other supporting surfaces throughout the extent of the height of cut adjustment.

It will be noted from the above that the reel and bedknife axes are relatively fixed as to spacing by being mounted on the side plates 10 and this relationship, as well as the angle of the bedknife 20, is not disturbed during the height of cut adjustment. A line interconnecting these two axes is maintained at the same angular relationship to the ground during the vertical movement of the plates 10 relative to the wheels 30 and the roller assembly 35. This maintains the bedknife 20 at the same angular position relative to the ground plane with which the wheels and rollers contact regardless of the height of cut. There will be a slight horizontal movement of the axis of the roller shaft 51 relative to the wheel axis 31, but this will be of no consequence. The wheel axis 31 will be moved concentrically around the reel axis 26.

It will be apparent from the above that I have provided a simple, inexpensive arrangement for accomplishing height of cut adjustment in a reel-type mower structure without the use of expensive cam arrangements or other complicated or expensive mechanisms. The arrangement provides for positive adjustment with ease and without disturbing the preset angular position of the bedknife relative to the ground plane upon which the wheels and roller rest.

Having thus described this invention, what I claim is:

1. A lawn mower comprising a frame including a pair of sideplates secured together in laterally spaced longitudinally extending relationship, a cutter reel and cooperating cutter bar assembly extending transversely between said sideplates and fixed thereto, a pair of ground-engaging wheels disposed outside the respective sideplates and mounted for rotation on a common transverse axis, a ground engaging roller assembly mounted for rotation about a transverse axis spaced longitudinally from said wheel axis, means for mounting said wheels and said roller for simultaneous vertical movement relative to the sideplates to vary the height of cut of such reel and cutter bar assembly; said means including a pair of pivot plates mounted adjacent the respective sideplates for pivotal movement relative thereto about the axis of said reel and carrying axle members for supporting said wheels, means for connecting said pivot plates together for simultaneous pivotal movement about said reel axis and relative to said sideplates, a pair of roller-supporting arms pivoted adjacent said sideplates for vertical swinging movement about a common transverse axis spaced from said reel axis, said arms and said pivot plates being on opposite sides of the respective sideplates, and means for connecting said pivot plates and said arms together for simultaneous vertical movement relative to said sideplates, said means comprising a link pivoted to each of said pivot plates and its cooperating arm and extending through a slot in the respective sideplate.

2. A lawn mower according to claim 1 in which the pivot plates are disposed inwardly of the respective sideplates and the roller-supporting arms are disposed outwardly of the respective sideplates.

3. A lawn mower according to claim 2 in which the means for connecting the pivot plates together comprises a transversely extending connecting bar, a crossbar support extending between the sideplates at a position spaced longitudinally from said connecting bar, and a screw assembly extending between said connecting bar and crossbar for moving the connecting bar relative to the crossbar and the pivot plates about the reel axis.

4. A lawn mower according to claim 3 in which the pivot plates are discs eccentrically pivoted about the reel axis, said crossbar being part of a yoke which has arms extending along the pivot discs and being rigidly secured thereto.

5. A lawn mower according to claim 4 in which the reel and cutter bar assembly includes a knife support bar extending transversely of said sideplates and being connected thereto for turning adjustment about a transverse axis, said roller-supporting arms being pivoted intermediate their ends for vertical swinging movement about said transverse axis.

6. A lawn mower according to claim 5 in which said wheel axle members extend through slots in the respective sideplates which are arcuate and have their centers at the reel axis.

7. A lawn mower according to claim 6 in which the roller carried by said arms is disposed rearwardly of their pivot axis, said links connecting the forward ends of said arms to said pivot discs, each of said links being of Z form and pivoted to the respective pivot discs and arms, said slots in the respective sideplates in which said links are disposed having offset portions to prevent interference with the links.

8. A lawn mower according to claim 3 in which said screw assembly includes a knob having a ball and socket bearing joint at its one end at the crossbar and a connection at its other end to the connecting bar comprising a split collar with flanged wings engaged by a channel portion fixed to said screw assembly.

* * * * *